United States Patent [19]

North

[11] 4,285,465
[45] Aug. 25, 1981

[54] THERMOSTATIC DEVICES

[75] Inventor: Royston J. North, Cheltenham, England

[73] Assignee: Walker Crosweller & Company Limited, Cheltenham, England

[21] Appl. No.: 32,878

[22] Filed: Apr. 24, 1979

[51] Int. Cl.$^3$ ............................................. G05D 23/13
[52] U.S. Cl. ................................... 236/12 A; 236/100
[58] Field of Search ................... 236/12 R, 100, 99 K; 73/368.2, 368.7

[56] References Cited

U.S. PATENT DOCUMENTS

| | | | |
|---|---|---|---|
| 2,828,075 | 3/1958 | Panza et al. | 236/12 R |
| 2,911,153 | 11/1959 | Pett | 236/12 R |
| 2,923,478 | 2/1960 | Di Giulio | 236/12 R |
| 3,124,304 | 3/1964 | Stuhl | 236/12 R |
| 3,503,262 | 3/1970 | Staire | 236/100 X |
| 3,768,728 | 10/1973 | Blank | 236/12 R |
| 3,955,759 | 5/1976 | Knapp | 236/12 R |

Primary Examiner—William E. Tapolcai, Jr.
Attorney, Agent, or Firm—Imirie and Smiley

[57] ABSTRACT

A thermoscopic unit such as for use in a thermostat of a fluid mixing valve comprising a hollow body in which a cylindrical convoluted bellows unit is located and sealed to the body to define an expansion chamber in which a thermally responsive material, such as wax, is contained. Temperature changes resulting in a change of volume of the material in the expansion chamber apply an external pressure to change the axial length of the bellows unit, and this may be operably connected to an actuator for a valve assembly. Preferably, there is a reservoir of the material constituted by a tubular coil encircling the hollow body, or a hollow cone extending therefrom. Such reservoir is filled with the material and is in communication with the expansion chamber and provides additional heat transfer surfaces to give fast response to temperature changes.

7 Claims, 4 Drawing Figures

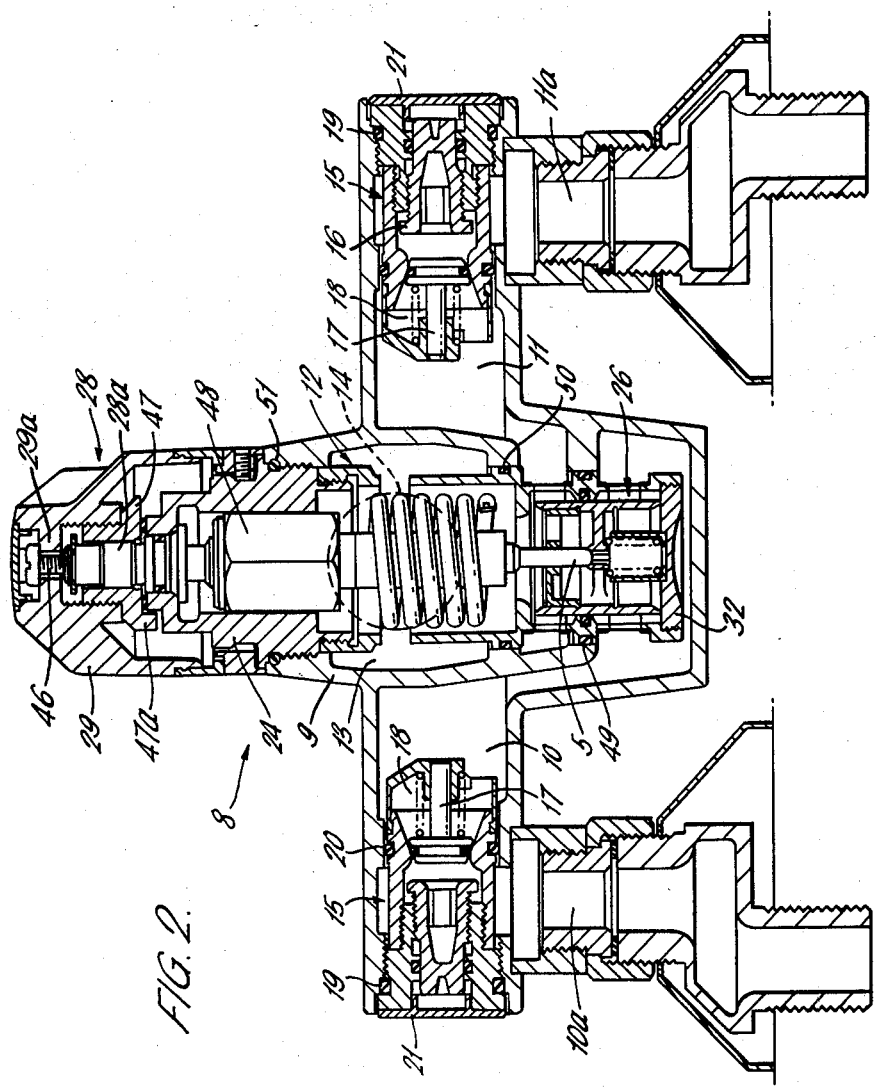

THERMOSTATIC DEVICES

BACKGROUND OF THE INVENTION

1. Field of the Invention

This invention concerns improvements in or relating to thermostatic devices, and has special application to thermoscopic units such as are used in thermostatic devices, for instance fluid mixing valves for ablutionary appliances.

2. Description of the Prior Art

Thermostatic devices are known in which a thermoscopic unit comprises a volume of a thermally responsive material of which the change of volume is used to operate an actuator, for example to operate an actuator of a fluid mixing valve to maintain the fluid output of the valve at a predetermined substantially constant temperature.

It is already known to provide a bellows unit in which the bellows form a closed chamber inside of which the thermally responsive material is contained as a mass to which thermal changes are transmitted by heat transfer through the contact of fluid with the exposed external surface of the bellows unit.

Heat transfer to a mass of material, particularly waxes is slow and often non-uniform, and for this reason some thermoscopic units rely on vaporisation of the material, for example the use of alcohols is known. However, this invention does not intend to be applied to such materials where there is vaporisation and condensation of the thermally responsive material.

SUMMARY OF THE INVENTION

It is an object of this invention to provide a thermoscopic unit which has a rapid response to changes in temperature of a fluid from which heat is transferred to or from the thermoscopic unit over a wide temperature range. Furthermore, it is an aim to provide a thermoscopic unit which is reliable in operation in a thermostatic device over a prolonged period of use.

Another object of the invention is to provide an improved design of thermoscopic unit which can be readily mounted in a thermostatic device.

Yet a further object is to provide an improved thermostatic device comprising a thermoscopic unit and enabling efficient and effective operable connection between a valve of the thermostatic device and the thermoscopic unit.

According to this invention we provide a thermoscopic unit comprising a hollow body containing a thermally responsive material and a bellows unit mounted inside the body whereby a change in volume of the thermally responsive material is transmitted to the bellows unit through the application of pressure applied to the outside of the bellows unit by the thermally responsive material.

By this arrangement the thermally responsive material can be confined in an expansion chamber having a shallow or thin section through which heat transfer can be rapid.

Preferably, the bellows unit is sealed relative to the hollow body and is disposed in an internal bore of the body and is co-axial therewith. The internal bore can receive the bellows unit, and facilitates the fixing and-/or location of the bellows unit thereto.

Another preferred feature of this invention is the provision of a reservoir containing further thermally responsive material, and the reservoir is in communication with the expansion chamber defined between the bellows unit and the body. The reservoir increases the volume of thermally responsive material responsive to temperature changes, and also, by correct design can increase the surface area for heat transfer.

Preferably, the reservoir comprises a tubular coil which encircles the body in spaced relationship thereto so as to allow free passage of a fluid over the coil and the outer surface of the body. Alternatively, the reservoir may be defined by a hollow cone-shaped member which surrounds the body and is flared outwards from the axial direction of the body, and preferably is coaxial therewith.

Such reservoirs are preferred as they can be disposed co-axially with the body and conveniently be arranged in fluid mixing chamber or fluid pathways where such thermoscopic devices are usually applied.

Preferably the bellows unit comprises a convoluted cylindrical metal body closed at one end, and sealed to the internal bore of the body. Such metal bellows exhibit low hysteresis and can be designed for transmission of axial movement on expansion and contraction of the thermally responsive material to an actuator received within the bellows and operably connected thereto. Conveniently, the bellows unit is provided with an opening at one end to receive and locate an actuator for operable connection thereto. The actuator may be employed to control a fluid mixing device.

Conveniently the actuator is operably connected to a closed end of the bellows unit so that the actuator moves simultaneously with the bellows unit. The connection may be a simple fixing or fastening. However, the actuator may be connected through suitable biassing means provided to ensure that in use the actuator moves with the bellows unit.

The thermally responsive material may comprise any substance having a substantially uniform change in volume per unit temperature change over the temperature range for which the thermoscopic unit is to be used. Preferred materials are waxes, preferably waxes containing a high proportion of hydro-carbons. Additionally it is preferred that the waxes should be selected so that through the temperature range of intended use, they have a partial or wholly liquid phase at the upper end of such range.

It has been found that thermoscopic units according to this invention in which the change in volume of a thermally responsive material is transmitted externally to a bellows unit are faster in sensing temperature changes and are more reliable in service than certain of the known prior type of unit in which a volume of thermally responsive material is contained within the bellows. Usually such volume of material is substantial and the heat transfer rates therethrough are slow compared to the fast temperature changes that can occur in service. The bellows are preferably of metal, and selected to exhibit low hysteresis in service.

Additionally, the thermoscopic unit is designed to reduce stresses to obviate the possibility of fatigue failure of the bellows unit in service.

According to a further aspect of this invention, we provide a fluid mixing device incorporating a thermoscopic unit as afore-mentioned.

Such fluid mixing device comprises seperate inlets for the fluids to be mixed, usually hot and cold water, and an outlet through which the fluid mixture is discharged. The mixing of the fluids is controlled by a mixing valve assembly which includes a valve member for controlling delivery of the fluids to be mixed to a mixing chamber and a manual control assembly for positioning the valve member so that the proportions of fluids entering the mixing chamber can be selected in accordance with the temperature desired.

The thermoscopic unit according to this invention is located in the mixing chamber to monitor the temperature of the fluid mixture. Any variation in the temperature of the fluid mixture from the predetermined or pre-set temperature is automatically compensated for by the thermoscopic unit. An increase or decrease in volume of the thermally responsive material, depending on whether the temperature of the fluid mixture has risen or fallen, is transmitted to the bellows unit which, in turn, moves the actuator to adjust the position of the valve member so that the proportion of the fluids to be mixed is adjusted and the temperature of the fluid mixture is changed until it reaches the desired pre-set temperature determined by the initial setting of the manual control assembly.

The valve member preferably comprises a shuttle valve adapted to engage seatings defining ports opening or closing relative to respective fluid supplies on movement of the actuator of the thermoscopic unit.

The shuttle valve may be operably connected to the actuator by a spring acting between a seating of the fluid mixing valve assembly and the closed end of the bellows unit.

Such an arrangement ensures that the shuttle valve can be mounted to provide a self-centering action on movement as there is not rigid nor fixed connection to the actuator.

Other objects and advantages of the present invention will become apparent from the later description of preferred embodiments which are disclosed herein.

The invention will now be described with reference to the accompanying drawings.

BRIEF DESCRIPTION OF THE DRAWINGS

FIG. 2 is a sectional elevation of a fluid mixing device incorporating the thermoscopic unit shown in FIG. 1;

Figure 1:
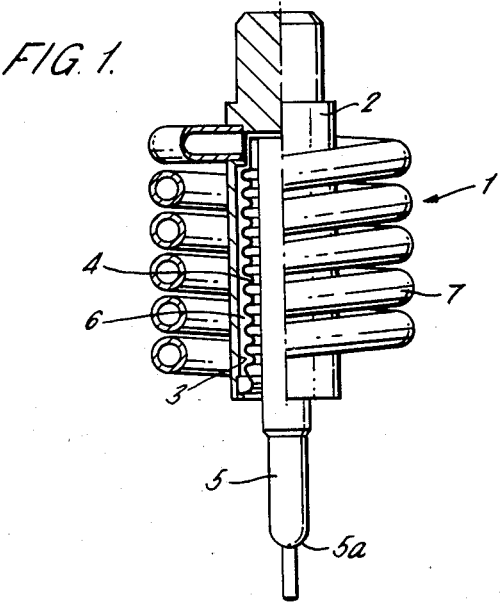
FIG. 1 is a side elevation, partly in section, of a thermoscopic unit according to this invention.

The thermoscopic unit 1 shown in FIG. 1 of the accompanying drawings comprises a generally cylindrical body 2 having a blind internal bore 3 and a convoluted cylindrical metal bellows unit 4 housed within the bore 3. The bellows unit 4 is hollow but closed at one end and the open end receives an actuator 5 for the purpose to be described later herein.

The open end of the bellows unit 4 is sealed to the mouth of the bore 3 so as to define an expansion chamber 6 extending between the body 1 and the bellows unit 4. The chamber 6 is filled with a suitable thermally responsive material, for example a wax which expands and contracts on temperature changes. The material would be selected for the temperature range for which the thermoscopic unit is designed to operate so that over that range, a substantially uniform rate of expansion/contraction per unit temperature change is achieved.

The body 1 is encircled over substantially its entire axial length by a tubular coil 7 which is spaced from the body 1 to allow fluid to flow between the coil and the body and between the loops of the coil. The free end of the coil 7 is closed, and the other end is connected to and in communication with the chamber 6 adjacent to the inner closed end of the bore 3. The coil 7 provides a reservoir filled with the same thermally responsive material as the chamber 6.

In use, the thermoscopic unit 1 is located in a fluid path to respond and/or monitor changes in the temperature of the fluid flowing around or over the unit. An increase in temperature results in expansion of the material contained in the chamber 6 and the coil 7. Such expansion applies a pressure to the bellows unit 4 which is thus compressed so as to reduce the axial length thereof. This movement of the bellows unit can be transmitted by the actuator 5 to control operation of a valve or similar device to reduce or change the direction of flow of the fluid, or to change the proportions in which two or more fluids are mixed so as to maintain a substantially constant temperature.

Figure 3:
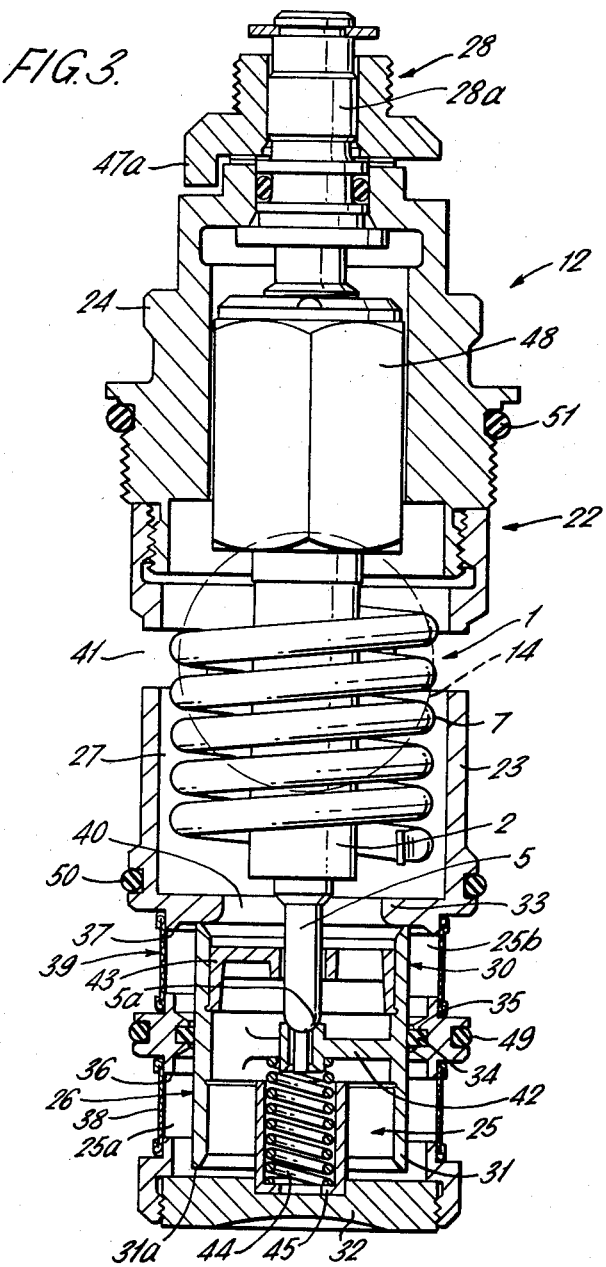
FIG. 3 is a sectional elevation, to an enlarged scale, of part of the device shown in FIG. 2.

A fluid mixing device 8 incorporating the thermoscopic unit 1 as just described is shown in FIGS. 2 and 3 of the accompanying drawings to which reference will now be made.

The fluid mixing device 8 comprises a hollow body 9 having two separate fluid inlet passages 10 and 11 connected to supplies of hot and cold water 10a, 11a respectively. The hollow body 9 houses a thermostatic mixing valve assembly 12 and comprises an outlet chamber 13 having an outlet port 14 (shown in dashed lines) which would be connected in known manner to a pipe or pipes leading to a shower rose or other discharge head or spray (not shown).

The flow of fluid through the fluid inlet passages 10, 11 is controlled by a respective valve assembly 15 comprising an isolator valve 16 and a poppet valve 17. Each isolator valve 16 is adjustable to vary the opening of the inlet supply to the associated inlet passage, and may be adjusted to a position in which the inlet supply is closed thereby isolating the associated inlet passage from the hollow body 9. Each poppet valve 17 is resiliently biassed by a spring 18 to a closed position. The biassing of the spring 18 is such that during normal operation the pressure of the fluid entering through the respective inlet supply is such as to hold the poppet valve 17 open against the spring bias. However, should there be a reduction in pressure, or a negative pressure, the poppet valve 17 closes preventing back-flow of fluid into the associated supply line from the inside of the body 9.

Each valve assembly 15 is retained in the body 9 and sealed relative to the associated inlet passage by a pair of O-ring seals 19, 20. There is a respective end cap 21 which is detachable to allow adjustments of the isolator valve 16 or removal of the valve assembly 15.

The thermostatic mixing valve assembly 12, shown in detail in FIG. 3 is arranged to control mixing of the hot and cold water to provide a fluid mixture having a substantially constant temperature to the outlet port 14. The assembly 12 comprises a hollow generally cylindrical body 22 formed by two elements 23, 24. The element 23 defines a valve chamber 25 containing a valve assembly 26 and a fluid mixing chamber 27 containing the thermoscopic unit 1. The element 24 houses a control assembly 28 manually operable through an external control knob 29 (see FIG. 2) to adjust the valve assembly 26 to preset the required temperature or temperature range of the mixture to be discharged through the outlet port 14.

The valve assembly 26 includes a shuttle valve 30 comprising a hollow cylindrical valve member 31 axially slidable within the valve chamber 25 between opposed valve seats 32, 33. The valve seat 32 closes the end of the element 23. The valve member 31 is sealed relative to the valve chamber 25 by a flexible seal 34 located in a groove 35 in the inner wall of the valve chamber 25 intermediate the valve seats 32 and 33. The seal 34 divides the valve chamber into two separate chambers 25a and 25b. The chamber 25a communicates with the inlet passage 10 through a plurality of circumfentially spaced ports 36 in the chamber wall, and the chamber 25b communicates with the inlet passage 11 through another series of circumferentially spaced ports 37 in the chamber wall.

Gauze filter screens 38 and 39 extend around the valve chamber and cover the ports 36 and 37 respectively to prevent any detritus carried by the fluid entering the mixing chamber 12 and obstructing or otherwise interfering with or wearing the valve member 31.

The valve member 31 is operable between two extreme positions, these being shown respectively in FIGS. 2 and 3. In FIG. 2, the valve member 31 is in engagement with the valve seat 32 so that the chamber 25a is isolated and only cold water can enter the chamber 25b and flow between the end 31b of the valve member and the valve seat 33 through a central port or opening 40 in the valve seat 33. The opening 40 is in communication with the mixing chamber 27 where the fluid passes over and around the thermoscopic unit 1 until it flows through a series of circumferentially spaced outlet ports 41 leading to the outlet chamber 13.

In FIG. 3, the valve member 31 is in engagement with the the valve seat 33 so that the chamber 25b is isolated and only hot water can enter the chamber 25a by passing between the end 31a of the valve member and the valve seat 32 so as to enter into the valve member and to flow through the interior thereof towards and through the opening 40.

Movement of the valve member 31 between its extreme positions is controlled by the actuator 5 which acts between the bellows unit of the thermoscopic unit 1 and an apertured abutment 42 integral with the valve member. The actuator 5 passes through a central clearance opening in an apertured vane member 43 fixed to the valve member by an annular lip located in a complementary internal groove in the valve member 31. The end 5a of the actuator 5 is rounded to nest in a complementary recess formed in the abutment 42. A return spring 44 acting on the abutment 42 resiliently biases the valve member 31 towards the actuator 5 so that the actuator and valve member always move simultaneously. The spring is housed in a sleeve 45 located in the valve seat 32 to guide and shield the spring from fluid pressure and fluid turbulence as fluid flows through the valve member 31.

Initial axial movement of the actuator 5 to adjust the valve member 31 to the position giving the required fluid output temperature is effected through the control assembly 28 by the rotation of the control knob 29 which is fixed through splines and a flange 29a to rotate a control spindle 28a. A screw 46 holds the knob 29 in position, and a hub 47 keyed both to the spindle 28a and the knob 29 has a stop lug 47a which is arranged to engage a pair of stop faces (not shown) on the element 24. The stop faces are angularly offset so that rotation of the member 46 is limited to about 270 degrees, and in use this is sufficient to move the valve member 31 between the two opposed extreme positions as depicted in FIGS. 2 and 3.

Subsequent axial movement of the actuator 5 to adjust the valve member to compensate for changes in the temperature of fluid in the mixing chamber 27 is achieved by the responsive actuation of the valve member 31 through the movement of the bellows unit 4.

As will be understood from the foregoing description, an increase in fluid temperature causes the material in the chamber 6 and coil 7 to expand so exerting a force on the bellows unit 4 to compress same, and this axial movement depresses the actuator 5. This movement of the actuator 5 moves the valve member 31 towards the valve seat 32 so that the proportions of hot and cold water entering the mixing chamber are respectively decreased and increased by the change in clearance defining pathways between the valve member 31 and said valve seats 32 and 33. The temperature of the fluid in the mixing chamber 27 is thus reduced to the desired temperature. Conversely, a fall in the temperature in the mixing chamber 27 leads to the contraction of the material in the chamber 6 and coil 7 and this causes the bellows unit 4 to expand axially making the actuator 5 to rise or lift carrying the valve member 31 that is also biassed by the spring 44. Again, the movement of the valve member 31 changes the proportions of the hot and cold water entering the mixing chamber 27 by respectively increasing and decreasing the clearance and pathways between the valve member 31 and the respective seats 32 and 33. When the temperature in the mixing chamber 27 is increased to the pre-set requirement and substantially stabilized, no further movement of the actuator 5 will occur.

The control assembly 28 includes an overload safety device 48 housing a spring (not shown). The overload device 48 is provided to prevent undue loads being applied to the thermoscopic unit 1 on rotation of the control assembly 28. In some instances, the overload device can also provide a fail-safe feature in the event of temperature surge, or fluid supply failure.

The thermostatic mixing valve assembly 12 is mounted in the body 9, and is screwed into the body 9 and is sealed thereto by three flexible seals 49, 50 and 51. The entire thermostatic mixing valve assembly 12 is a modular device for fitting to a suitable body for connection to the fluid supply. The assembly 12 can be fitted or removed for servicing or replacement if, and when required to the body. The thermostatic mixing valve assembly 12 is also such that a series of different temperature ranges can be pre-set by appropriate selection of the thermally responsive material, and any one of a selection of thermostatic mixing valve assemblies can be fitted to a suitable body.

Figure 4:
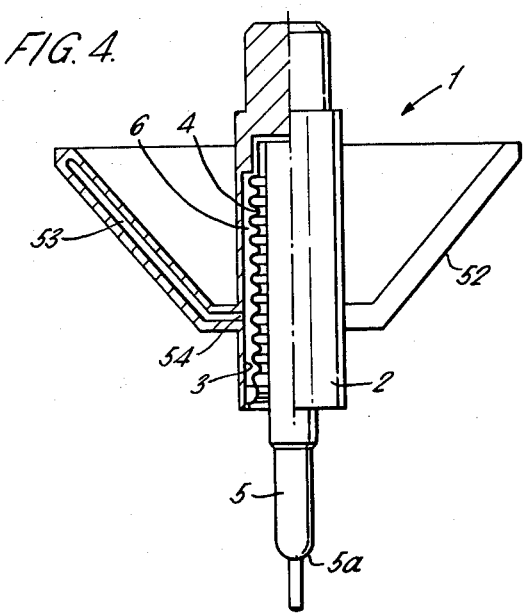
FIG. 4 is a side elevation, partly in section, of an alternative thermoscopic unit according to this invention.

Referring now to the alternative embodiment of a thermoscopic unit shown in FIG. 4, in this embodiment the coil 7 is replaced by a cone-shaped member 52. For convenience, like reference numerals are used to indicate parts similar to those shown in FIG. 1 and aforedescribed.

The member 52 is hollow and defines a circumferentially extending reservoir 53 filled with the same material as the chamber 6. The reservoir 52 communicates with the chamber 6 through an annular port 54 in the wall of the body 2. The thermoscopic unit operates in the same manner as described with reference to the first embodiment with the hollow interior of the cone-shaped member 52 acting as a heat transfer portion having a large surface area. The fluid may flow over and around the member 52 in a similar manner to that previously described, but can be applied in flow paths where flow is to be interrupted by the operation of a valve controlled by the actuator 5. However, the thermoscopic unit of this alternative embodiment may also be fitted to a fluid mixing valve, and comprise part of a module such as illustrated and described with reference to FIG. 2.

It will be appreciated that the invention is not restricted to the above-described thermoscopic units shown in FIGS. 1 and 4 which may be modified in a number of ways. For example, either the coil 7 and the member 52 may be replaced by any other suitably profiled component, that is one having a large surface area over which heat transfer can be effected to the thermally responsive material contained therein.

The bellows unit may be made of materials other than metal, for example, an elastomeric material such as a rubber or plastics having properties suitable to withstand the temperature range and conditions obtaining in the mixing chamber, and having a suitable hysteresis factor. However, metallic bellows units are preferred because of their low hysteresis and longer operating life in service.

The thermally responsive material may comprise any suitable material, but is preferably a wax of the type including a hydrocarbon and which is blended so that by careful selection provides a thermally responsive filler for the expansion chamber and the preferred reservoir which is effective in both solid and/or liquid phases. As afore-mentioned waxes are the preferred thermally responsive material.

What is claimed is:

1. A thermostatic device for an ablutionary water mixing appliance, said device comprising a housing, valve means axially movable within said housing for controlling the proportions of fluids to be mixed, a thermoscopic device mounted in said housing so that mixed fluid flows over the external surfaces of said thermoscopic unit, an actuator operable connected to said thermoscopic unit for controlling movement of said valve means, said thermoscopic unit comprising a bellows unit mounted within a hollow body located in said housing, an expansion chamber defined between said bellows unit and said hollow body and containing thermally responsive material, the thermally responsive material comprising a wax based material selected for the temperature range of use and having a liquid phase at the higher temperatures of said range, said actuator being movable by responsive movement of the thermoscopic unit on change of temperature of the mixed fluid.

2. A thermostatic device according to claim 1 wherein said thermoscopic device includes a reservoir of thermally responsive material which is in communication with said expansion chamber, and said reservoir comprises a thin-walled hollow element that is disposed in a mixing chamber formed in said housing.

3. A thermostatic device according to claim 2 wherein said valve means comprises a shuttle valve operably connected to said thermoscopic device through said actuator which is biassed by a spring acting between a seating in said housing remote from said thermoscopic unit, and said actuator extends within the bellows unit which is in the form of a convoluted cylindrical body having a closed end engaged by said actuator whereby said closed end is movable on changes of volume of said thermally responsive to move said actuator against said spring bias which also serves to retain said actuator in operable engagement with said closed end of said bellows body.

4. A thermostatic device according to claim 3 wherein said shuttle valve is movable between two respective sets of ports opening to hot and cold respective inlet supplies, and said thermostatic device further comprises manually operable control means for adjusting the position of said shuttle valve for pre-setting the temperature required for the mixed fluid.

5. A thermostatic device according to claim 4 wherein said manually operable control means comprises a safety overload device through which adjusting movement of said shuttle valve is transmitted through said thermoscopic unit and the actuator thereof.

6. A thermoscopic unit for an ablutionary water mixing appliance, said unit comprising a hollow body housing, a bellows unit, said bellows unit comprising a convoluted hollow cylindrical member closed at one end and the opposed end being in sealing engagement with said hollow body, an expansion chamber defined between said housing and said bellows unit, a tubular coil encircling said hollow body in spaced relationship thereto and having one end in communication with said expansion chamber and the other end sealed, thermally responsive material contained in said expansion chamber and said coil and confined therein by said sealing engagement of said bellows unit to said hollow body, said thermally responsive material comprising a wax based material selected for the temperature range of use and having a liquid phase at the higher temperatures of said range.

7. A thermoscopic unit according to claim 6 wherein said hollow body has an internal cylindrical bore in which said bellows unit is received with said closed one end of said bellows unit being adjacent an internal end face of said bore, and an actuator received within said bellows unit and an operable connection between said closed one end of said bellows unit and said actuator whereby axial movement of said bellows unit is transmitted to said actuator.

* * * * *

UNITED STATES PATENT OFFICE
CERTIFICATE OF CORRECTION

Patent No. 4,285,465    Dated  August 25, 1981

Inventor(s)  NORTH, Royston Jesse

It is certified that error appears in the above-identified patent and that said Letters Patent are hereby corrected as shown below:

Add the following claim for priority to the title page by inserting the following new lines:

--[30] FOREIGN APPLICATION PRIORITY DATA

May 6, 1978 United Kingdom ..... 18122/78--.

Signed and Sealed this

Seventeenth Day of November 1981

[SEAL]

Attest:

GERALD J. MOSSINGHOFF

Attesting Officer    Commissioner of Patents and Trademarks